United States Patent [19]
von Essen et al.

[11] Patent Number: 5,588,407
[45] Date of Patent: Dec. 31, 1996

[54] RECIPROCATING PISTON ENGINE WITH WEIGHT COMPENSATION

[75] Inventors: Mathias von Essen, Alsdorf; Christoph Bollig, Stolberg; Werner Bick, Würselen, all of Germany

[73] Assignee: FEV Motorentechnik GmbH & Co. KG, Aachen, Germany

[21] Appl. No.: 352,806

[22] Filed: Dec. 1, 1994

[30]  Foreign Application Priority Data

Dec. 1, 1993 [DE] Germany .............................. 9318308 U
Apr. 29, 1994 [DE] Germany .............................. 9407145 U

[51] Int. Cl.⁶ ............................................... F02B 75/06
[52] U.S. Cl. ................................................... 123/192.2
[58] Field of Search ............................ 123/192.1, 192.2

[56]  References Cited

U.S. PATENT DOCUMENTS

| 1,640,634 | 8/1927 | Wise ................................... 123/192.1 |
| 5,131,355 | 7/1992 | Bukovics et al. ................... 123/192.2 |

FOREIGN PATENT DOCUMENTS 2333038  1/1975  Germany .

Primary Examiner—Noah P. Kamen
Attorney, Agent, or Firm—Spencer & Frank

[57]  ABSTRACT

A reciprocating piston engine, in particular an internal combustion engine with at least one cylinder in which a piston connected with a crankshaft is driven so it can move back and forth. The crankshaft (1) is connected with at least one cam disk turning with it. The cam disc has a control profile which acts as an actuator on at least one additional unit, in particular a compensating weight.

12 Claims, 3 Drawing Sheets

RECIPROCATING PISTON ENGINE WITH WEIGHT COMPENSATION

BACKGROUND OF THE INVENTION

The invention relates to a reciprocating piston engine, in particular an internal combustion engine with at least one cylinder in which a piston connected with a crankshaft is driven so it can move back and forth.

In reciprocal piston engines of the above identified type, additional units of the most diverse kind, for example compensating weights which, in the sense of the present invention are considered to be additional units, are driven directly via the crankshaft, if required with the interposition of kinematically interconnected connections. In the process, compensating weights for compensating free inertia forces in such a reciprocating piston engine are provided in the form of rotating flyweights which, depending on the type of use, are also provided on gear teeth for driving auxiliary units and/or additional units and connected with the crankshaft.

SUMMARY OF THE INVENTION

It is the object of the invention to provide a reciprocating piston engine of the type mentioned at the outset wherein such additional units can also be disposed inside the engine body, wherein at least the take-off for operating kinematically interconnected connections can take place inside the engine body.

This object is attained in accordance with the invention in that the crankshaft is connected with at least one cam disk turning with it and having a control profile which acts as the actuating means on at least one additional unit. This arrangement has the advantage that such cam disks can also be housed inside the engine housing in the area of the crankshaft chamber, namely in that a cam disk with a control profile matched to the respective intended use can be directly connected with the crankshaft. In appropriate uses it is of course also possible to connect the cam disk with the crankshaft on the outside of the engine body. The required force and/or movement effects required for actuating the additional unit(s) can be picked up directly at the control profile. This is also possible in such a way that the cam disk with its control profile is disposed inside the engine housing, while the additional unit is disposed outside of the engine housing, in which case appropriate transmission means between the cam disk and the additional unit are provided, which are passed through the wall of the engine housing.

In a particularly advantageous development of the invention it is provided that at least one compensating weight is provided as the additional unit, which is driven on the reciprocating piston engine to be movable back and force as a function of the turning of the crankshaft, and which is connected with a spring arrangement. It is possible by means of a weight which is driven to be movable back and forth to either compensate oscillating weight forces caused by the connecting rods and the piston directly at the location where they arise, for example by such a cam disk being disposed directly on the crank, and to provide the associated compensating weight in the reciprocating piston engine with the same direction of effect but with an opposite movement flow. The compensating weight can be driven in a purely translatory movement or in a pivot movement. It is then possible, particularly in connection with multi-cylinder in-line reciprocal piston engines to provide compensating weights still inside the engine housing respectively in the area of the crankshaft ends in order to compensate in this way the free moments of inertia of the first and higher orders by corresponding dimensions of the pair of compensating weights. Because the compensating weights are disposed as closely as possible to the crankshaft ends it is possible to keep the compensating weights comparatively small. The further advantage of the embodiment of the invention lies in that the law of movement of the compensating forces can be predetermined via the control profile of the cam disk. In the simplest embodiment the cam disk can have a circular profile and be connected with the crankshaft with the center of its circle located eccentrically in respect to it, wherein in the case of a one-cylinder engine the eccentricity is located on the side facing away from the crank throw. With a multi-cylinder engine, for example an in-line engine with the compensation of the free moments of inertia by means of a pair of compensating weights, the eccentricity must be provided in such a way that the moment of inertia caused by the compensating weights acts opposite to the moment of inertia of the oscillating drive components. To be able to provide the required returning movement, coupling is provided via a spring arrangement in place of an elaborate mechanical coupling, so that the weight is moved in one direction of movement via the control profile and is returned in the opposite direction of movement via the spring arrangement. The system must be laid out in such a way that resonances are suitably prevented. In place of a spring arrangement as the preferred coupling for maintaining constant contact between the control profile and the additional unit—in this case the compensating weight—it is also possible to employ other elements acting in the same way. The arrangement can also be further developed in such a way that the compensating weights are stopped and/or the engagement with the control profile is released when predeterminable rpm are exceeded.

A further advantage of the invention in connection with the compensating weight as the additional unit lies in that it is possible in a space-saving manner and with an appropriate design of the control profile to compensate even free moments of inertia and inertia forces of higher order by means of such additional compensating weights, wherein these additional compensating weights can be suitably arranged in the same plane of rotation as the compensating weights for compensating the free moments of the first order. Here, too, is it possible to pick up the movement of these compensating weights directly at the crankshaft via the cam disk. Accordingly, in contrast to a revolving flyweight it is possible in an advantageous manner to match the direction of movement of the compensating weight which can be moved back and forth to the effective direction of the inertia forces to be compensated and/or the moments of inertia, so that in this case definable oscillating forces and/or moments can be generated.

In practical development of the invention it is provided for the course of the control profile to be steady. Jumps in the speed or acceleration in the course of transmission to the compensating weight are prevented by means of this.

In further practical development of the invention it is provided that the spring arrangement exerts a spring force having a progressive nonlinear force curve. A simpler suppression of resonance in the operational range results from such a layout of the spring arrangement. In this connection it is practical when the spring arrangement is connected under prestress with the compensating weight, so that lifting of the compensating weight off the control profile is assuredly prevented. It is practical for the spring arrangement to be connected with control means for changing the prestress, so that the natural frequency of the spring-weight system can be affected, for example as a function of the rpm.

In further development of the invention it is provided for a roller element to be disposed between the control profile and the compensating weight for preventing sliding friction between the compensating weight and the control profile.

In further development of the invention it is provided that the compensating weight is connected via guide means with the reciprocating piston engine. The inherent tilt possibilities of a spring arrangement are prevented by the disposition of such guide means, so that a precise, directionally stable guidance of the compensating weights is possible here. The guide means can be constituted by slideways, drag or tilt levers. By employing levers in particular as guide means there is the option in an advantageous manner of embodying the spring arrangement as a torsion spring. In this case the torsion spring is connected with the lever in the area where the latter is hinged, while its other end rests against the control profile. The lever can here be embodied as a transmission element acting on the weight. However, it is particularly practical for the lever itself to constitute the compensating weight.

When using a torsion spring it is provided in practical development of the invention that at least two torsion springs are provided for a spring arrangement, wherein at least one torsion spring is embodied to be tube-shaped and the other torsion spring is arranged coaxially inside the tube-shaped torsion spring. With the spring characteristic preselected, it is possible by means of this to provide a torsion spring arrangement of short structural length. Such a torsion spring arrangement can also extend in a space-saving manner below the crankshaft in the oil pan, wherein the additional advantage lies in that no noticeable displacement work is taken up by the oil surrounding the torsion spring.

In advantageous further development two torsion spring arrangements extending parallel on both sides of the crankshaft are provided in connection with a multi-cylinder in-line engine, wherein the torsion spring arrangements are respectively seated on opposite ends of the engine, and wherein a compensating weight is connected with each torsion spring arrangement, which is embodied in the manner of a pivot arm and whose main extent is aligned perpendicularly with the axis of the associated torsion spring arrangement. With this arrangement there is the possibility to optimally match the kinematics and dynamics of the spring-weight system, defined by the pivot axis, the application point of the control profile and the center of the weight, with the moments of inertia to be balanced by means of an appropriate selection thereof.

In this connection it is provided in practical development of the invention that the pivot-arm-like compensating weight has a recess in the area of its free end which fits around the other torsion spring arrangement. This offers an opportunity for arranging the weight center of the compensating weight at as great a distance as possible from the torsion bar axis for realizing as large as possible a lift of the weight center of the compensating weight with relatively little spring twisting. The compensating weight can be clearly reduced in weight by this step.

In further development of the invention it is provided that the compensating weight is in operational engagement with at least one further additional unit. In this connection it is particularly practical if the further additional units are connected with the guide means which are embodied as drag or tilt levers. In this case there is the possibility of covering the kinematics of the compensating weights for the covering of automatic functions in the reciprocating piston engine, for example for the lubricating oil supply or for the compressed air supply of additional units.

BRIEF DESCRIPTION OF THE DRAWINGS

The invention will be described in detail by means of schematic drawings of an exemplary embodiment. Shown are in.

DETAILED DESCRIPTION OF THE INVENTION

Figure 1:
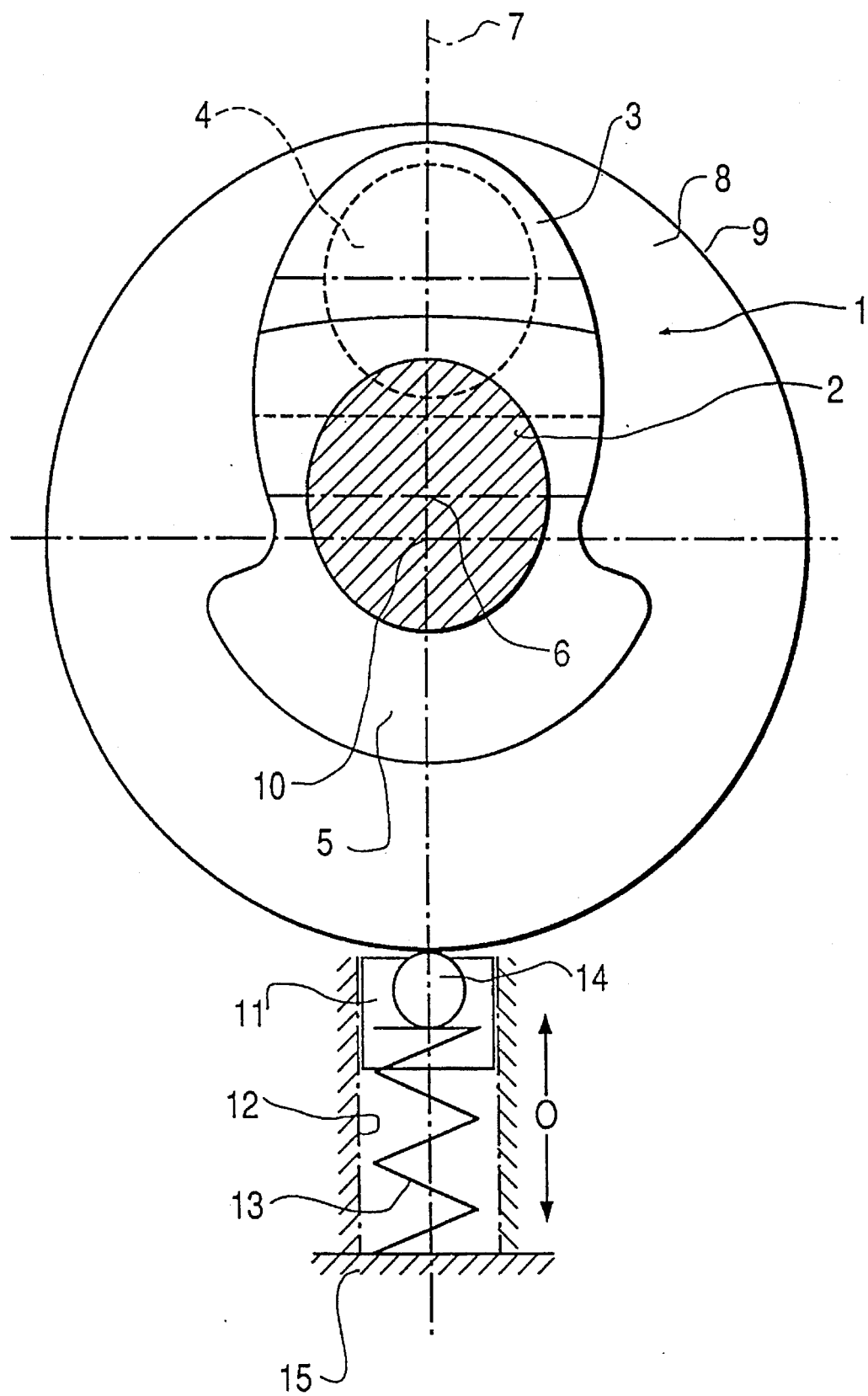
FIG. 1, the basic structure of the invention in principle.

A crank 1 of a crankshaft of a reciprocal piston engine, for example an internal combustion engine, not shown in detail here, is illustrated in a front view in FIG. 1. The crank 1 essentially is comprised of a crankshaft 2, with which a crank journal 4 is connected via two crank arms 3 extending parallel with each other. The crank arm 3 is designed as a counterweight 5 on the side facing away from the crank journal 4, so that the weight parts of the crank mechanism, not shown here in detail, rotating on a circular path around the axis of rotation 6 of the crankshaft 2, i.e. essentially the crank journal 4 and the portion of the connecting rod, not shown in detail here, hinged on the crank journal 4 and rotating with it, are essentially balanced.

The exemplary embodiment represented here is based on a single cylinder reciprocal piston engine whose cylinder in this illustration is located vertically above the crankshaft axis, as indicated by the cylinder axis 7, so that the piston is at top dead center in the position shown. Accordingly, during operation the oscillating weights constituted by the piston, piston pin and the upper portion of the connecting rod could not be compensated by the counterweight 5, so that free inertia forces become active in the direction toward the cylinder axis 7. In multi-cylinder engines these free inertia forces or moments of inertia—in respect to the reciprocal piston engine as a whole—then appear as corresponding translatory and/or rotatory movements.

Up to now, oscillating inertia forces were compensated by oppositely running flyweights which then correspondingly generate inertia forces acting in the opposite direction, by means of which the free inertia forces or free moments of inertia of the oscillating drive elements could be compensated.

In the schematic example illustrated in FIG. 1, a cam disk 8, fixedly connected with the crankshaft 2 and rotating along with it, is provided for the weight compensation of a single cylinder reciprocal piston engine. The exterior profile of the cam disk 8 represents the control profile in this case. In the exemplary embodiment represented, the control profile is constituted by a circle, so that the center 10 of the cam disk 8 is disposed eccentrically in respect to the axis of rotation 6 of the crankshaft 2 for generating an appropriate counter-stroke in respect to the crank journal. The orientation of this eccentricity is provided such that it lies in the desired effective direction.

A compensating weight 11 is disposed in the extension of the cylinder axis 7 or of an axis extending through a plane defined on the one hand by the axis of rotation of the crankshaft and on the other hand by the cylinder axis 7 and extending parallel with the cylinder axis 7, which is seated, movable back and forth, in appropriate guides 12, for example a schematically represented sliding guide. The compensating weight 11 rests by means of a roller element 14 against the control profile 9 of the cam disk 8 and is fixedly supported on the engine body by means of a spring arrangement 13. Thus, when the crankshaft 1 turns, the compensating weights 11 always moves in the opposite direction from the piston guided by the crank journal 4.

With an appropriate matching of the compensating weight 11 and the eccentricity, i.e. the distance between the crankshaft axis 6 and the center 10 of the cam disk 8, the oscillating inertia forces are therefore compensated.

In this case the cam disk 8 can also simultaneously be a part of the crank arm 3, and the counterweight 5 can be integrated into the cam disk 8 in the same way. To prevent the appearance of free inertia forces, both crank arms of a single cylinder engine would be provided with respective cam disks 8 which act on respectively one compensating weight 11. Otherwise, the effective direction of the compensating weight 11 would have to be disposed below the crank exactly in the extension of the cylinder axis 7. The spring arrangement 13, here shown schematically only as a helical spring, should be free of damping to a great extent and laid out in such a way that resonances are prevented as much as possible during operation.

As already mentioned at the outset, the compensating weight is defined as an "additional unit". Accordingly it is also possible to drive an additional unit required for the operation of the engine additionally to or in place of the compensating weight 11 via the control profile 9 of the cam disk 8, for example a pressure generator for the lubricating oil supply or for generating compressed air.

Figure 2:
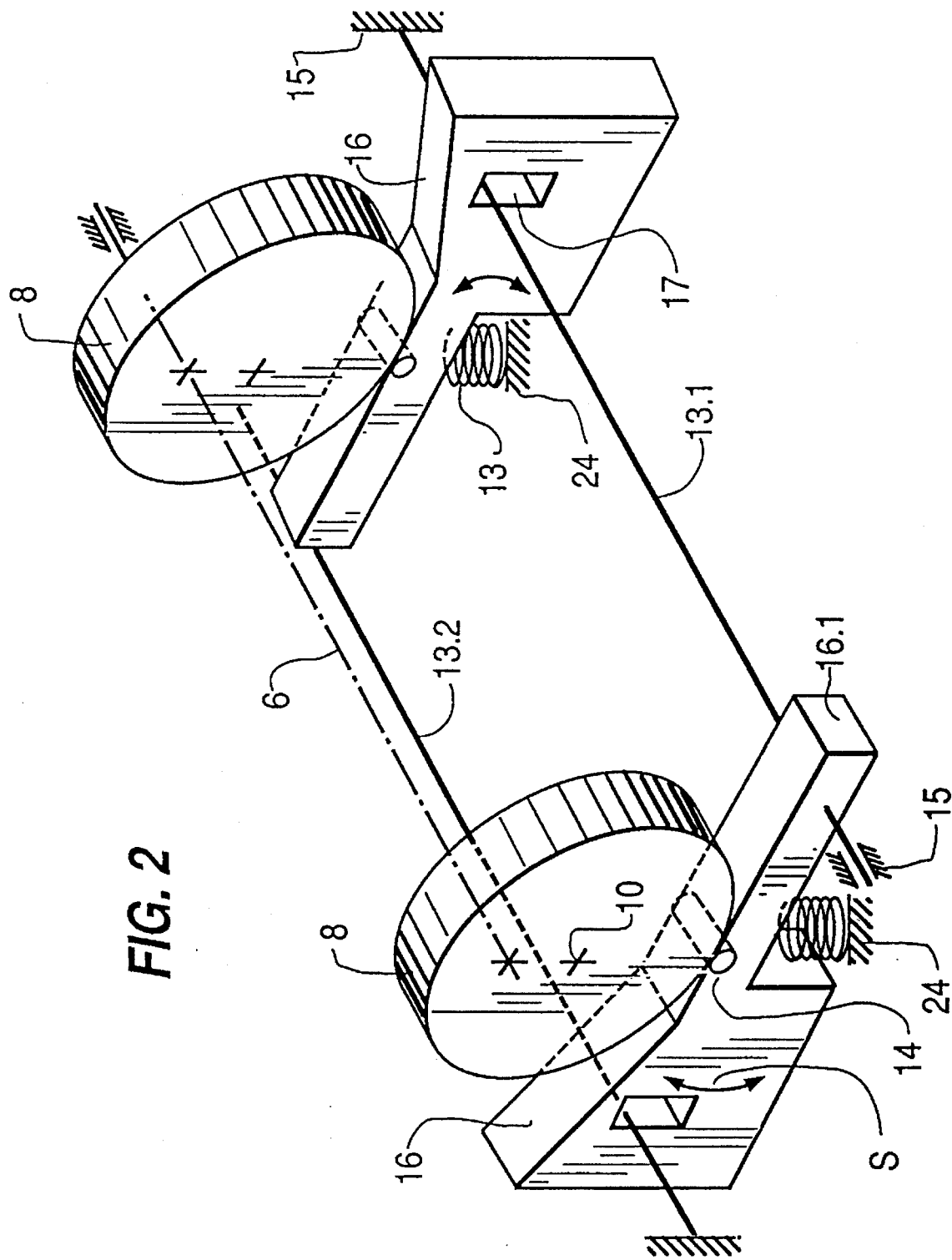
FIG. 2, an embodiment of the arrangement for a weight compensation.

An exemplary embodiment of the weight compensation of an multi-cylinder engine, for example a four-cylinder engine, is illustrated schematically in FIG. 2. There, the crankshaft 2 is only indicated by means of its axis of rotation 6. As previously described, in this exemplary embodiment a cam disk 8 with a control profile 9 is connected respectively at the ends a the crankshaft 2. A pivotable compensating weight 16 rests via a roller element 14 against the control profile 9 and with its other end is seated in a back-and-forth pivotable manner on the engine housing 15. This compensating weight can also be supported via a helical spring. However, as shown here schematically, it is useful if the compensating weight 16 is connected with the engine housing 15 by means of respective torsion springs 13.1 and 13.2. The advantage of the use of a torsion spring in particular lies in that the latter can also extend in a space-saving manner in the oil pan, without noticeable displacement work being taken up by the oil surrounding the torsion spring.

Figure 3:
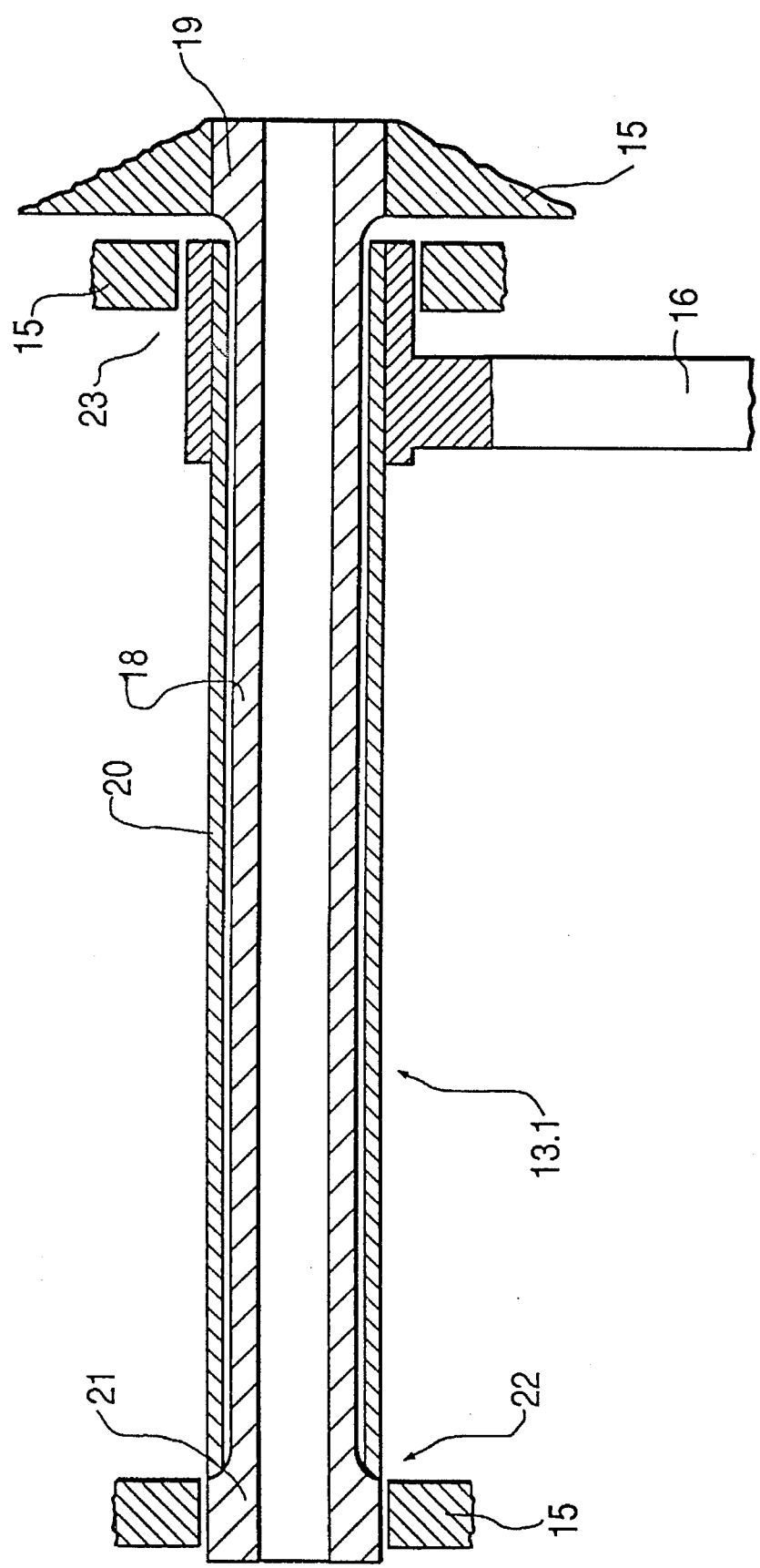
FIG. 3, the structure of a torsion spring arrangement.

The schematic representation in FIG. 2 shows an arrangement wherein the torsion springs 13.1 and 13.2 extend parallel on both sides of the axis of rotation 6 of the crankshaft. The ends of the two torsion spring arrangements 13.1 and 13.2, whose structural design will be explained in detail by means of FIG. 3, are respectively connected with the engine housing 15. The one end 16.1 of the pivot-arm-like compensating weight 15 is connected, fixed against relative rotation, with the associated end of the respective torsion spring arrangement 13.1, 13.2, and extends transversely to the longitudinal direction of the crankshaft below the cam disk 8 and is again supported via a roller element 14 on the cam disk 8. The spring arrangement 13.1, 13.2 is placed under an appropriate prestress, so that contact between the control profile of the cam disk 8 and the roller element is assured.

In this case the pivot-arm-like compensating weight 16 is possibly shaped such that the direction of movement of the center of weight S and thus the effective direction of the compensating weight are matched to the effective direction of the moment of inertia and/or the inertia forces to be compensated.

Since by means of the distance between the pivot axis of the compensating weight 16, predefined by the axis of the spring arrangement, and the application point of the cam disk on the compensating weight, defined here by the position of the roller element 14, it is possible to exert an effect on the leverage and thus an effect on the pivot path of the center of weight S, a recess 17 is respectively provided in the compensating weights, which each fits around the other torsion spring arrangement, so that it is possible to take the structural conditions of the crank housing into consideration also for the installation of the torsion spring arrangement. It is possible to achieve a large lift of the center of weight 5 by means of the size of the distance from the center of weight with little twisting of the spring, and in this way to reduce the weight of the compensating weight clearly.

As shown in FIG. 1, it is furthermore possible to support the pivot-arm-like compensating weight 16 via a helical spring arrangement 13 in addition to the torsion spring arrangements 13.1 and 13.2. A further option for the outlay of the spring arrangements is provided by means of this.

The torsion spring arrangements 13.1 and 13.2, as well as the possible additional spring arrangement 13, are under predefined prestress. To be able to reduce the rolling friction between the cam disk 8 and the roller element 14, caused by the prestressing, the additional spring arrangement 13 can be connected with the engine housing at 24 in such a way that its prestress can be changed. This change in the prestress is suitably made as a function of the operational state of the engine, particularly as a function of the rpm, in order to be able to vary the matching of the spring-weight system in this way. Of course it is also possible to change the prestress of the torsion spring arrangements 13.1 and 13.2 without such an additional spring support 13 by means of an appropriate constructive design of the connection with the engine housing, and with the disposition of an appropriate regulating means 24, in particular as a function of the rpm of the engine.

The arrangement for a four-cylinder engine is illustrated in FIG. 2, wherein the compensating weights move synchronously, i.e. in the same direction. With a three-cylinder engine, the control profile of the two cam disks 8 must be embodied in such a way that the compensating weights move asynchronously, i.e. counter to each other.

The structure of a torsion element is shown in more detail in a cross section in FIG. 3. It comprises a first torsion spring tube 18, which is fixedly clamped in the engine housing 15 with its end 19. A second torsion spring tube 20 has been pushed coaxially over the torsion spring tube 18 and is fixedly connected therewith at the end 21 of the first torsion spring tube 18. The free end 22 of the torsion spring arrangement formed thereby is seated in the engine housing 15 in such a way that a free rotational movement of the end 22 is possible.

The end 23 of the outer torsion tube 20 which faces away from the end 21 is rotatably seated via the pivot-arm-like compensating weight 16, which is connected with it secure against relative rotation, in the same way in the engine housing 15. It is possible, by means of such nesting of two, but also several torsion spring tubes, to usefully realize any desired spring rigidity for a length predefined by the engine housing.

It can be easily seen that here, too, a lever can be provided in place of a compensating weight or that in addition to one or a plurality of compensating weights further additional units can be connected with the lever 16 of the pivot-arm-like compensating weight, so that the kinematics of this lever or of the compensating weight is available for driving appropriate additional units.

The control profile 9 of the cam disk 8 need not necessarily be embodied as a circle, but can be designed in adaptation to the desired kinematics of the additional unit to be driven, wherein the path of the control profile 9 should be embodied as a steady curve to prevent acceleration jumps. For example, the shape of a cam or similar mathematically steady curves which can be used for the desired kinematics is possible.

With reciprocating piston engines with several cylinders it is possible, for example with an in-line engine, to respectively assign an appropriate compensating weight to each piston.

With reciprocating piston engines of different geometry, for example V-engines or the like, this form of weight compensation offers the opportunity to arrange the direction of movement of the balance weights defined by the guidance in such a way that it is also possible to compensate differently directed free moments of inertia.

With an appropriate design of the roller element 14 it is also possible to orient the torsion spring 13.1 transversely to the axis of rotation 6 of the crankshaft 2, wherein furthermore there is also the possibility to dispose the lever 16 embodied as the compensating weight in the area below the crank but outside of the circle of flight.

What is claimed:

1. A reciprocating piston engine, comprising:

an engine housing having at least one piston cylinder formed therein;

a piston located within the piston cylinder and being movable in a back-and-forth motion therein;

a crankshaft connected to said piston and being driven by said piston to rotate about an axis;

a cam disc connected to said crankshaft so as to rotate therewith, said cam disc having a selected control profile;

at least one compensating weight attached to said engine housing and being in engagement with the control profile of said cam disc, said compensating weight being driven by said cam disc in a predetermined back and forth motion as a function of the rotation of the crankshaft so as to compensate for at least one of inertia forces and moments of inertia occurring in the piston engine; and at least one torsion spring connected to said compensating weight and urging said compensating weight in a direction of said cam disc to maintain a constant contact between the control profile of said cam disc and said compensating weight.

2. The engine defined in claim 1, wherein the control profile of said cam disc is a steady curve, such that said compensating weight experiences a smooth change in acceleration during its movement.

3. The engine defined in claim 1, wherein said torsion spring exerts a spring force having a progressive nonlinear force curve.

4. The engine defined in claim 1, wherein said torsion spring is prestressed against said compensating weight.

5. The engine defined in claim 1, wherein said at least one torsion spring comprises a torsion spring arrangement having an outer tube-shaped torsion spring, and an inner torsion spring coaxially arranged inside the tube-shaped torsion spring.

6. The engine defined in claim 1, wherein said engine housing has a plurality of piston cylinders arranged in-line therein, and wherein said at least one torsion spring comprises two torsion springs, each extending parallel to said crankshaft and on opposite sides thereof, and each having two opposite ends seated within said engine housing; and wherein said at least one compensating weight comprises two compensating weights, each being connected to a respective torsion spring, and each having a pivot arm extending essentially perpendicularly to an axis of the respective torsion spring.

7. The engine defined in claim 1, wherein said at least one torsion spring comprises a first torsion spring connected to said compensating weight, and a second torsion spring; and wherein said compensating weight has a pivot arm with a free end having a recess formed therein, said second torsion spring being fit within the recess.

8. The engine defined in claim 1, further comprising a roller element positioned between said compensating weight and the control profile of said cam disc.

9. The engine defined in claim 1, further comprising guide means connecting said engine housing to said compensating weight for guiding the motion of said compensating weight.

10. The engine defined in claim 1, further comprising at least one additional unit operationally engaged with said compensating weight.

11. The engine defined in claim 1, wherein said crankshaft has a crank arm with said cam disc being connected thereto.

12. The engine defined in claim 1, wherein said engine is an internal combustion engine.

* * * * *